US008244655B2

(12) United States Patent
Hubbard et al.

(10) Patent No.: US 8,244,655 B2

(45) Date of Patent: Aug. 14, 2012

(54) FORCE-SENSING ORTHOTIC ELECTRIC DEVICE CONTROLLER

(75) Inventors: Sandra L. Hubbard, Ft. White, FL (US); Michael Rosen, Burlington, VT (US)

(73) Assignees: University of Florida Research Foundation, Inc., Gainesville, FL (US); University of Vermont and State Agricultural College, Burlington, VT (US)

(*) Notice: Subject to any disclaimer, the term of this patent is extended or adjusted under 35 U.S.C. 154(b) by 926 days.

(21) Appl. No.: 12/250,156

(22) Filed: Oct. 13, 2008

(65) Prior Publication Data

US 2009/0099997 A1 Apr. 16, 2009

Related U.S. Application Data

(63) Continuation-in-part of application No. 12/113,543, filed on May 1, 2008.

(60) Provisional application No. 60/915,165, filed on May 1, 2007.

(51) Int. Cl.
*G06F 17/00* (2006.01)
*G06N 5/00* (2006.01)

(52) U.S. Cl. .......................................................... 706/45

(58) Field of Classification Search ......................... None
See application file for complete search history.

(56) References Cited

U.S. PATENT DOCUMENTS 3,967,321 A 7/1976 Ryan et al.
4,260,035 A * 4/1981 Loveless et al. ............... 180/6.5
4,840,634 A * 6/1989 Muller et al. ................... 623/24
5,020,815 A 6/1991 Harris et al.
5,775,332 A 7/1998 Goldman
5,800,364 A * 9/1998 Glennie et al. ................ 600/592
5,818,359 A 10/1998 Beach
5,907,318 A 5/1999 Medina
6,171,239 B1 * 1/2001 Humphrey .................... 600/372
6,452,584 B1 9/2002 Walker et al.
6,821,259 B2 11/2004 Rahman et al.
6,872,187 B1 3/2005 Stark et al.
7,080,710 B2 * 7/2006 Kwon et al. .................. 180/316
7,710,397 B2 5/2010 Krah et al.

(Continued)

FOREIGN PATENT DOCUMENTS

FR 2624002 6/1989

(Continued)

OTHER PUBLICATIONS

Lord, M. et al.; "Issues and themes in computer aided design for external prosthetics and orthotics"; 1988; Butterworth & Co.; J. Biomed. Eng.; vol. 10; pp. 491-498.*

(Continued)

*Primary Examiner* — Jeffrey A Gaffin
*Assistant Examiner* — Stanley K Hill
(74) *Attorney, Agent, or Firm* — Saliwanchik, Lloyd & Eisenschenk

(57) ABSTRACT

Control devices and kits of components of control devices are provided. The subject invention also provides systems for designing control devices and/or kits of components of control devices. A system user can provide data about an end user to an expert system via a user interface, and the expert system can use the data and a method for selecting appropriate components to design a control device and/or kit. The control device can be a self-referenced control device and can include a controller and a wearable interface.

16 Claims, 8 Drawing Sheets

U.S. PATENT DOCUMENTS

2003/0192728 A1 10/2003 Richey, II et al.
2005/0228515 A1* 10/2005 Musallam et al. .............. 700/83

FOREIGN PATENT DOCUMENTS

TW 568779 1/2004

OTHER PUBLICATIONS

Boone, David A. et al.; "Automated fabrication of mobility aids: Review of the AFMA process and VA/Seattle ShapeMaker software design"; 1994; Dept. of Verterans Affairs; Journal of Rehabilitation Research and Development; vol. 31, No. 1; pp. 42-49.*

Han, Jeong-Su et al.; "Human-Machine Interface for wheelchair control with EMG and Its Evaluations"; 2003; Proceedings of the 25th Annual International Conference of the IEEE EMBS; pp. 1602-1605.*

Bottos et al., "Powered wheelchairs and independence in young children with tetraplegia", *Developmental Medicine & Child Neurology*, 2001, vol. 43, pp. 769-777.

Fehr et al., "Adequacy of power wheelchair control interfaces for persons with severe disabilities: A clinical survey", *Journal of Rehabilitation Research and Development*, May/Jun. 2000, vol. 37, No. 3, pp. 353-360.

Furumasu et al., "Relevance of the pediatric powered wheelchair screening test for children with cerebral palsy", *Developmental Medicine & Child Neurology*, 2004, vol. 46, pp. 468-474.

Gary et al., "TOES (Toe Operated Enablement System)", Presented at the University of Vermont, Burlington Vermont, 2006.

Palisano et al., "Development and reliability of a system to classify gross motor function in children with cerebral palsy", *Developmental Medicine & Child Neurology*, 1997, vol. 39, pp. 214-223.

Palisano et al., "Effect of environmental setting on mobility methods of children with cerebral palsy" *Developmental Medicine & Child Neurology*, 2003, vol. 45, pp. 113-120.

Pratt, "Some aspects of modern orthotics", *Physiological Measurement*, 1994, vol. 15, No. 1, pp. 1-27.

Stein et al., "A wheelchair modified for leg propulsion using voluntary activity or electrical stimulation", *Medical Engineering & Physics*, 2003, vol. 25, No. 1, pp. 11-19.

* cited by examiner

FORCE-SENSING ORTHOTIC ELECTRIC DEVICE CONTROLLER

CROSS-REFERENCE TO RELATED APPLICATION

The present application is a continuation-in-part of co-pending U.S. patent application Ser. No. 12/113,543, filed May 1, 2008, which claims the benefit of U.S. Provisional Application Ser. No. 60/915,165, filed May 1, 2007, both of which are hereby incorporated by reference herein in their entirety, including any figures and drawings.

BACKGROUND OF THE INVENTION

Many technological devices including, for example, wheelchairs help to bridge the gap between what a user can do unaided and the demands of a particular task or environment. However, the systems for controlling such devices are typically externally-referenced, requiring the user to have appropriate motor functions in order to properly operate them.

Individuals with severe motor impairment of the upper quadrants are often limited in, or even excluded from, use of such devices. Existing methods of accessing mobility or communication devices generally require either head stability (i.e., to use a head pointer) or upper extremity control (i.e., to use a joystick). Individuals with severe motor impairment of the upper quadrants frequently have neither head stability nor functional upper extremity use. Thus, standard interface methods are suboptimal for this population.

Accordingly, a need exists in the art for mechanisms by which users having little or no extremity function or head stability are able to control powered devices.

BRIEF SUMMARY

The subject invention provides advantageous control devices and kits of components of control devices. The subject invention also provides systems for designing and implementing control devices and/or kits of components of control devices.

The control devices of the subject invention can comprise a controller and an orthosis for communicably connecting to the controller. The orthosis can comprise a force-sensing transducer for positioning between two adjacent body segments of the end user (or between the wearable interface and a body segment of the end user); wherein, when the orthosis is communicably connected to the controller, a force applied to the force-sensing transducer by at least one of the body segments is communicated to the controller for controlling an assistive device.

One embodiment of the invention provides a system for designing a control device. This system can comprise: an expert system; a user interface for a system user to provide data to the expert system; a menu of elements of the control device, wherein (at least one of) the elements can be selected by the system user via the user interface; and means for selecting appropriate components for the control device to meet functional needs and/or constraints of an end user. The expert system uses the data provided by the system user and the means for selecting appropriate components to design the control device.

The expert system can be any system capable of processing data from a system user. For example, the expert system can be a computer, a server, or a web-based server (though embodiments of the present invention are not limited thereto).

In another embodiment, a system for designing a kit of components of a control device comprises: an expert system; a user interface for a system user to provide data to the expert system; a menu of elements of the kit, wherein (at least one of) the elements can be selected by the system user via the user interface; and a means for selecting appropriate components for the kit to meet functional needs and/or constraints of an end user. The expert system can use the data provided by the system user and the means for selecting appropriate components to design the kit.

The kit can comprise: a controller; an orthosis for communicably connecting to the controller; and a force-sensing transducer for positioning between two adjacent body segments of the end user (or between the wearable interface and a body segment of the end user); wherein, when the control device is worn by the end user, a force applied to the force-sensing transducer by at least one of the body segments is communicated to the controller for controlling an assistive device.

In one embodiment, the subject invention includes a controller and a wearable interface communicably connected to the controller, where the wearable interface is to be worn over an end user's body part. The controller can operate a powered device according to instructions provided by the end user via the wearable interface.

In certain embodiments, the wearable interface can be an orthosis and can include a force sensing transducer for positioning between two adjacent body segments of the end user (or between the wearable interface and a body segment of the end user), wherein, when the control device is worn by the end user, a force applied to the force-sensing transducer by at least one of the body segments is communicated to the controller for controlling an assistive device. The powered device can be, for example, a wheelchair or a computer mouse.

In one embodiment, an orthosis is provided for controlling a powered device, such as a wheelchair or a device other than a wheelchair. A method for controlling a device having a controller can include attaching an orthosis to an end user's body part and applying a force by the body part onto a force sensing transducer positioned between two adjacent body segments of the end user or between the orthosis and a body segment of the end user. The force can then be communicated to the controller for controlling the device. In a particular embodiment, the powered device can be a computer mouse and the wearable interface can be an orthosis.

DETAILED DISCLOSURE

Figure 1:
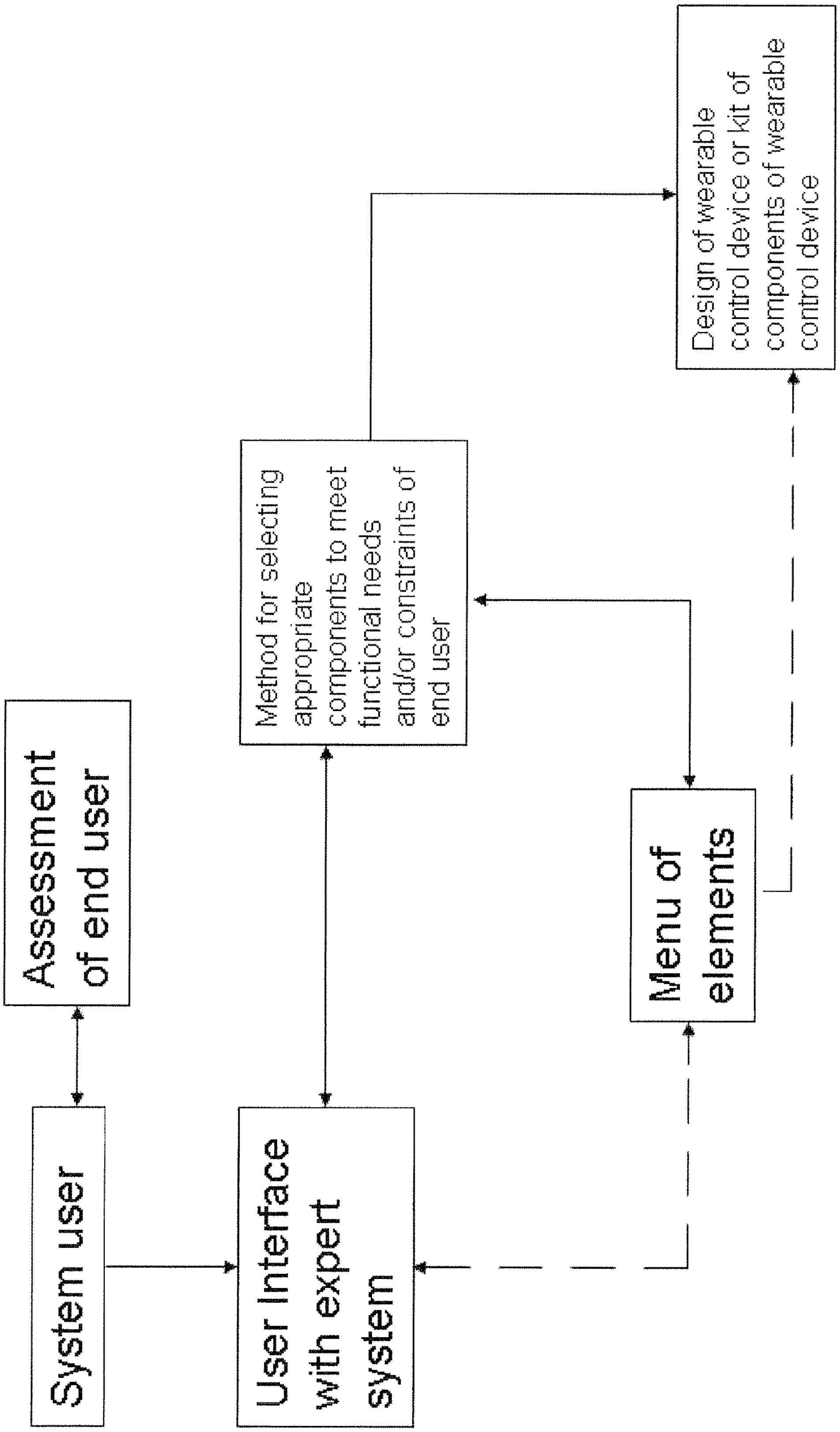
FIG. 1 shows a flow chart of a system for designing a control device or a kit of components of a control device according to an embodiment of the present invention.
Figure 2:
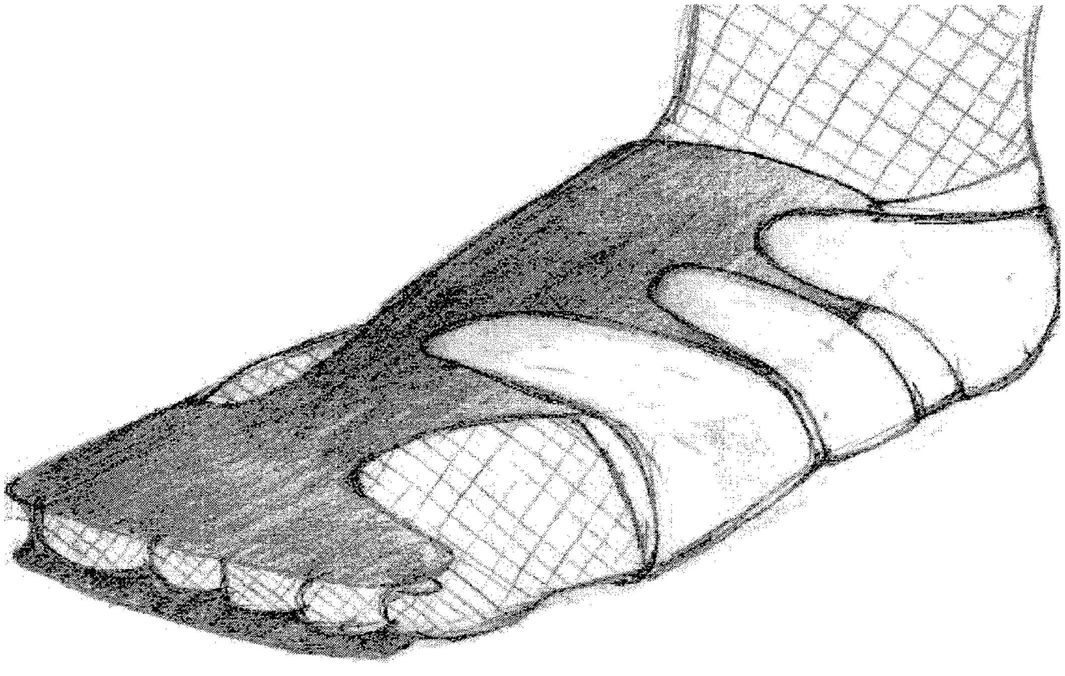
FIG. 2 shows the orthotic concept used in a control device according to an embodiment of the present invention.
Figure 3:
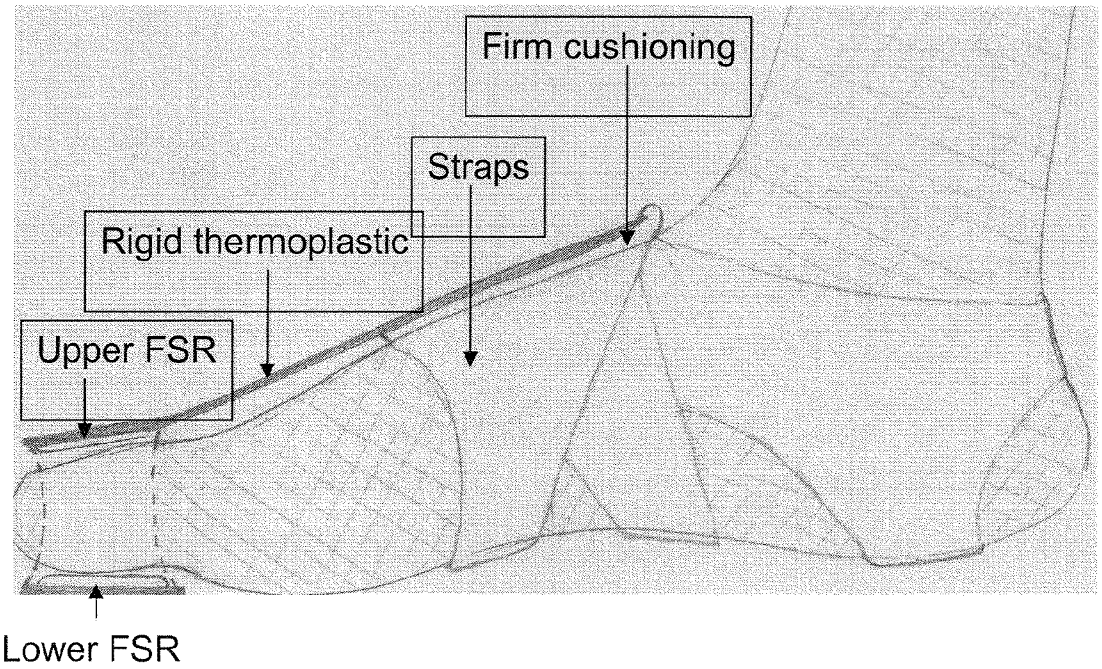
FIG. 3 shows an orthosis worn on a foot in a control device according to an embodiment of the present invention.
Figure 4:
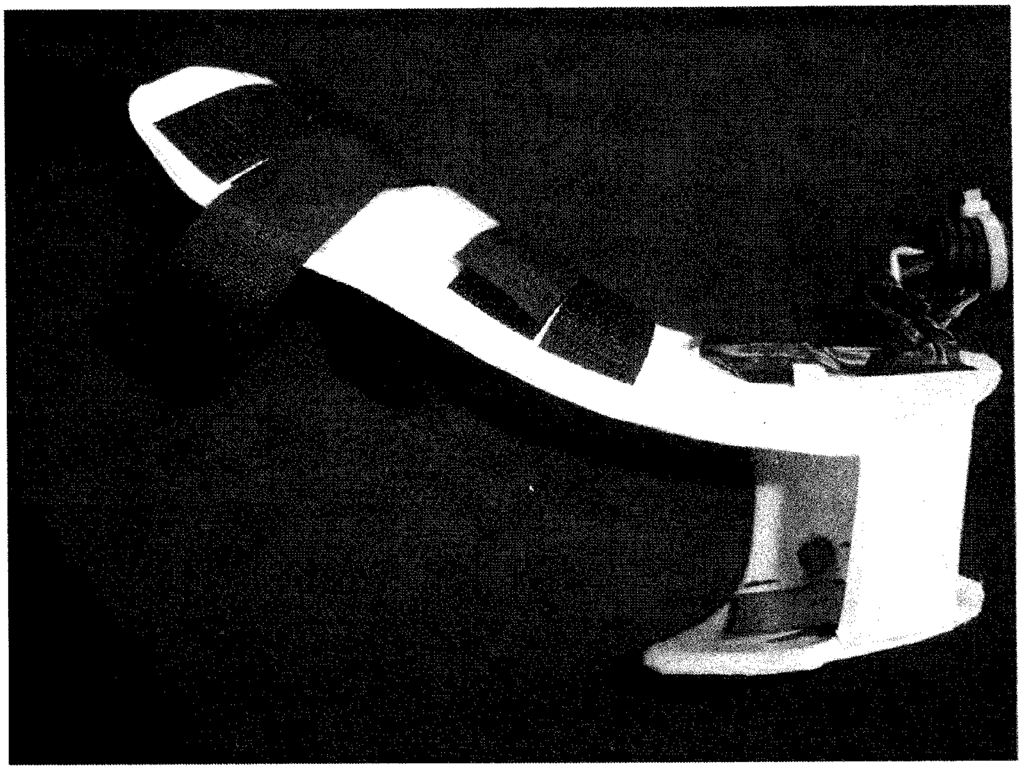
FIG. 4 is a photograph of an orthosis for use on a foot in a control device according to an embodiment of the present invention.
Figure 5:
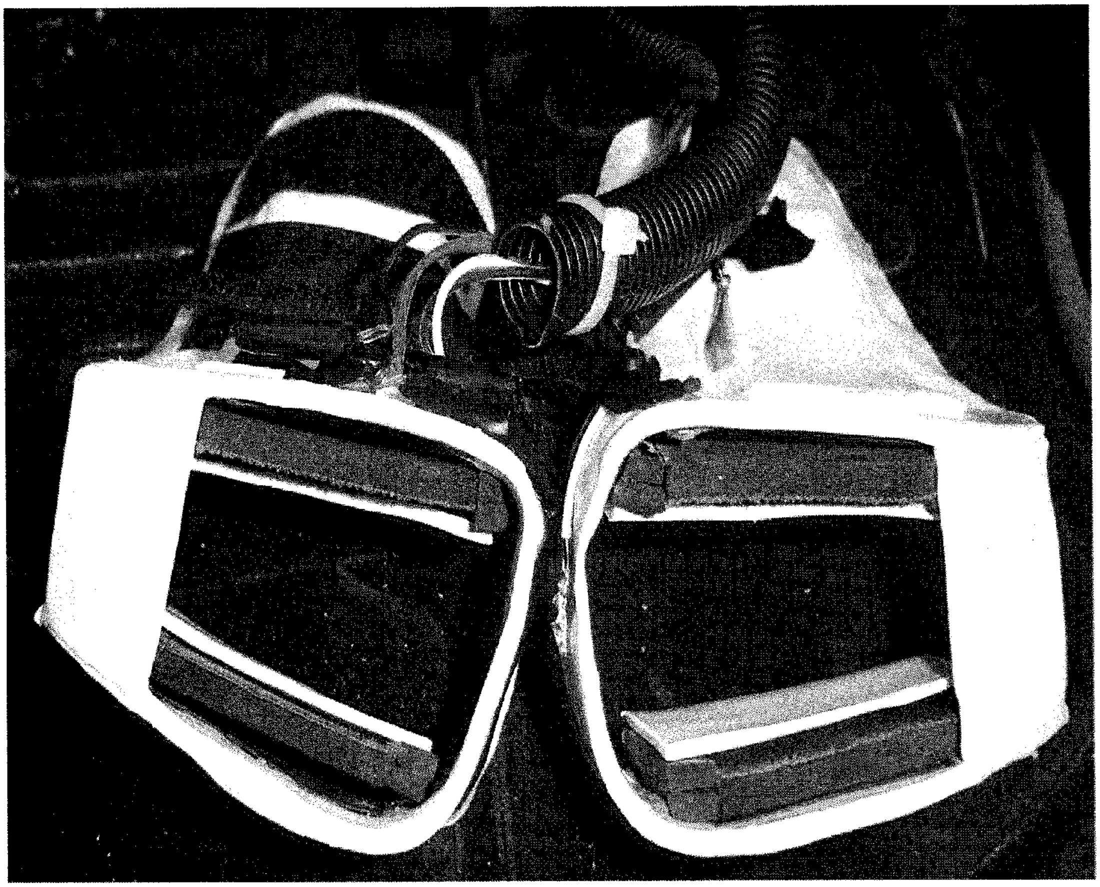
FIG. 5 is a photograph of an orthosis to be worn on each foot in a control device according to an embodiment of the present invention.

The subject invention provides advantageous control devices and kits of components of control devices. The subject invention also provides systems for designing control devices and/or kits of components of control devices.

The term "control device" refers to any device that can be used to control another device, where at least part of the control device can be worn on a body part, or body parts, of an end user. For example, a control device can comprise an orthosis and can be used to control an assistive device (though, it is important to note that control device applies to devices that can be used to control non-assistive devices as well).

When the phrase "the elements (of the menu) can be selected by the system user via the user interface" is used herein, it refers to both the system user directly choosing elements from the menu via the user interface, as well as elements being selected by the expert system applying the method for selecting appropriate components based on input from the system user provided via the user interface.

In one embodiment of the present invention, a system for designing a control device comprises: an expert system; a user interface for a system user to provide data to the expert system; a menu of elements of the control device, wherein (at least one of) the elements can be selected by the system user, either directly or indirectly, via the user interface; and a method for selecting appropriate components for the control device to meet functional needs and/or constraints of an end user. The expert system can use the data provided by the system user and the method for selecting appropriate components to design the control device.

The control device can comprise: a controller; and a wearable interface for communicably connecting to the controller, the wearable interface comprising a force-sensing transducer for positioning between two adjacent body segments of the end user or between the wearable interface and a body segment of the end user; wherein, when the wearable interface is communicably connected to the controller, a force applied to the force-sensing transducer by at least one of the body segments is communicated to the controller for controlling an assistive device. The wearable interface can include an orthosis. In many embodiments, the wearable interface can be an orthosis.

In another embodiment, a system for designing a kit of components of a control device comprises: an expert system; a user interface for a system user to provide data to the expert system; a menu of elements of the kit, wherein (at least one of) the elements can be selected by the system user, either directly or indirectly via the user interface; and a method for selecting appropriate components for the kit to meet functional needs and/or constraints of an end user. The expert system can use the data provided by the system user and the method for selecting appropriate components to design the kit.

The kit can comprise: a controller; a wearable interface for communicably connecting to the controller; and a force-sensing transducer for positioning between two adjacent body segments of the end user or between the wearable interface and a body segment of the end user; wherein, when the control device is worn by the end user, a force applied to the force-sensing transducer by at least one of the body segments is communicated to the controller for controlling an assistive device. The wearable interface can include an orthosis. In many embodiments, the wearable interface can be an orthosis.

In certain embodiments, the expert system can be a query-driven expert system. The method for selecting appropriate components to meet functional needs and/or constraints of an end user can comprise a decision guide. That is, the system user can be provided with queries about the end user, and the expert system can process the system user's responses to the queries via the user interface to determine which queries should be presented next in the decision guide. The system user's responses can include information about an end user's abilities, needs, and preferences. After sufficient data has been provided by the system user about the end user for the expert system to determine the appropriate components, a control device and/or a kit of components for a control device can be designed by the expert system.

The decision guide can be, for example, a software-based decision guide run by the expert system. The software-based decision guide can be used to help the expert system assess the end user's functional needs and/or constraints based on data provided by the system user via the user interface.

In one embodiment, the user interface can be a web-based interface that the system user can access using the internet or an intranet. Such a user interface can allow the system user to use the advantageous systems of the present invention from any location with internet access.

The menu of elements can be a catalog of materials, sensors, and other components that can be used to assemble a control device individualized for an end user. The menu of elements can include wireless transmitters so that an orthosis of a control device can be wirelessly communicably connected to a controller of the control device. Additionally, the menu of elements can include cables for establishing a wired connection between an orthosis and a controller of a control device. Any suitable components can be included in the menu of elements, and the elements can include off-the-shelf components as well as items that can be individualized to the needs and/or preferences of the end user.

In one embodiment, once the expert system has received sufficient data from the system user about the end user to determine the appropriate components, the expert system can select appropriate components and/or elements from the menu of elements. Thus, the expert system can design the control device and/or kit of components of a control device from elements included in the menu of elements.

In a further embodiment, the system user can select at least one element from the menu of elements to be included in the control device and/or kit of components of a control device. The expert system can also select elements from the menu of elements after processing data provided by the system user via the user interface.

The system user can be any person that can interact with the expert system to design a control device or kit. In many embodiments, the system user can be a clinician who can provide educated assessments of the end user.

The end user can be any person that can benefit from the advantageous control devices and/or kits of the subject invention. This includes, but is not limited to, persons with Alzheimer's disease, Amyotrophic Lateral Sclerosis, Parkinson's disease, Frederick's ataxia, muscular dystrophy, multiple sclerosis, spinal cord injury, cerebral palsy, stroke, traumatic brain injury, or any other condition that can limit a person's motor functions. Additionally, an end user can be a person, with no such condition, that can benefit from a control device or kit of the present invention. It is important to note that, in some cases, the system user can be the same as the end user.

FIG. 1 shows a flow chart of a system of designing a control device or kit of components for a control device according to an embodiment of the present invention. Referring to FIG. 1, the system user assesses the end user and interfaces with the expert system through the user interface. The system user can select one or more items from the menu of elements, via the user interface, to design part or all of the control device or kit of components, though it is not necessary (represented by the dotted line path). The user interface of the expert system interacts with the method for selecting appropriate components to meet the functional needs and/or constraints of the end user which then interacts with the menu of elements to select the appropriate components and/or elements. Finally, the control device or kit of components for a control device is designed. Thus, the data provided by the system user after assessment of the end user can be used to select the elements from the menu of elements to design the control device or kit. The expert system can receive the data from the system user via the user interface.

In a specific embodiment, the user interface can be a web-based interface, the expert system can be a query-driven expert system, the method for selecting appropriate components can comprise a software-based decision guide, and the menu of elements can be a digital catalog of components. The system user can provide responses to queries from the software-based decision guide, as well as other data, via the web-based interface, and the expert system can digitally interact with the menu of elements to select appropriate components and/or elements of the control device or kit.

A control device according to certain embodiments of the subject invention can comprise a controller and a wearable interface communicably connected to the controller. The wearable interface can be worn over, or attached to, a body segment or body segments of the end user. The controller can operate a powered device according to instructions provided by the end user via the orthosis. In one embodiment, the wearable interface can comprise at least one force-sensing transducer which can be positioned between two adjacent articulate body segments of the end user or between the wearable interface and a body segment of the end user. The wearable interface can comprise an orthosis. In many embodiments, the wearable interface can be an orthosis.

Control devices according to the subject invention are self-referenced with respect to the end user, as opposed to conventional control devices which are externally referenced. Such advantageous control devices provide an end user with the ability to smoothly control and operate a powered device. For example, an end user with limited control over his or her arms or legs could smoothly operate a control device of the present invention on a hand or foot since it is self-referenced with respect to the end user's hand or foot. On the other hand, an end user with limited arm control would have difficulty operating a typical joystick on a powered wheelchair since it is referenced to the wheelchair frame.

A control device of the subject invention can be used to control any powered device that provides assistive functions, such as mobility, communication, entertainment, health, and/or hygiene functions. Examples of devices that can be controlled by a control device of the invention include, but are not limited to, wheelchairs, scooters, telephones, cell phones, dressing aids, book holders, televisions, radios, page turners), computers, computer mice, computer monitors, and computer keyboards.

Wearable Interface

According to certain embodiments of the subject invention, the point of control of the control device can be provided by a wearable interface which can be located on the end user's body (as opposed to an interface positioned on the device to be controlled, such as a joystick mounted on a wheelchair arm rest). With conventional control devices controlled by interfaces located on the powered device itself, extraneous, inadvertent movements from the end user often cause the powered device to function in a manner not desired by the end user. By providing the point of control over a powered device on the end user's body, the effect of extraneous movements is reduced. For example, involuntary and extraneous movements associated with voluntary reaching and postural maintenance against gravity in individuals with abnormal muscle tone (i.e., athetoid, dystonic, ataxic) are inhibited by providing the point of control on an end user's body. Activation of the controller over a powered device is less distorted by unintended motor output. The wearable interface can comprise an orthosis. In many embodiments, the wearable interface can be an orthosis. FIGS. 2-5 show examples of an orthosis that can be worn over an end user's foot.

Controlled midline movement is required to operate many conventional powered devices (e.g., a wheelchair, where the upper extremity must remain on an armrest of the wheelchair). In certain individuals, controlled movement in the vicinity of the midline can be especially difficult. For example, individuals with neuromotor disorder are dominated by involuntary movement and primitive reflexes. Because the wearable interface (such as an orthosis) of embodiments of the subject invention can be worn on an end user's body segment, the need to maintain limb position at or near body midline is eliminated.

According to one embodiment, it is feasible for a body-referenced wearable interface to be activated across, for example, any joint in the body; that is, between any two articulated body segments. Thus, in certain embodiments, the wearable interface can include at least one force-sensing transducer on any wearable device, for example, a glove, shoe insole, or other piece of apparel. In one embodiment, the wearable interface with at least one force-sensing transducer can be provided on a decorative glove, shoe, boot, or other piece of apparel.

Because the wearable interface can be placed on the end user's body, the end user's voluntary muscle force can be exerted against at least one force-sensing transducer of the wearable interface that can be referenced to an adjacent more proximal segment of the same limb. The force-sensing transducer can also be stabilized by the segment of the limb. Such a mounting scheme is beneficial, especially if the limb is subjected to a perturbation, because both the control digit and the stabilizing surface will be displaced together with relatively little change in the distance or force between them.

In one embodiment, the wearable interface can require fewer anticipatory postural reactions of the trunk and less coordination to operate the powered device than normally required with conventional control devices. In a related embodiment, end user operation of a powered device can be based on fewer forces (i.e., ligamentous, frictional, etc.) than those associated with actually moving a limb. For example, a traditional joystick requires the end user to overcome abnormal movement patterns just to access the joystick. Further control over abnormal motor patterns is then required to exert accurate dynamic control over the joystick, seriously challenging the end user's capacities. According to this embodiment, a limb used to operate the wearable interface can be in a position assumed by the end user or placed in a posture effective in reducing involuntary motor activity.

In another embodiment, the wearable interface can have the ability to sense isometric force. In a related embodiment, the wearable interface can include an orthosis worn over the body segment of the end user, where at least one strain sensitive transducer is mounted to the surface of the orthosis.

Activation forces (i.e., instructions for the controller) can be applied by the body segment while stabilization forces are provided by the orthosis.

In a particular embodiment, the wearable interface can include an orthosis to be worn on or over the foot of an end user. Flexion and extension (FE) of the toes, relative to the foot, is natural and requires little concentration. Application of FE force, i.e., force up and down (dorsal and plantar), with little or no motion is also an undemanding motor act. In one embodiment of the invention, the wearable interface comprises a miniature force-sensing joystick mounted in and under a foot orthosis and operated by the end user's toes. An isometric joystick configured to embrace (for example, fit between and wrap partially around) the big and first toes is used in a related embodiment to produce one channel of control. Such a wearable interface senses flexion and extension forces of the toes and torsion produced by relative rotation of the toes, where such movement by the end user communicates various commands of operation to control the device.

In a further embodiment, the wearable interface can communicate with a controller to control the powered device. In a related embodiment, the powered device can be controlled by proportional isometric force. The wearable interface can comprise strain-sensitive transducers mounted to an orthosis, and output signals from the transducers/orthosis can communicate with the controller. In certain related embodiments, the orthosis can communicate with the controller via wireless technology.

An advantage of the use of approximately isometric force rather than movement or positional control is that if the two articulated body segments are submitted to external contract forces or to inertial forces, such as from wheelchair accelerations, for example, both the control limb segment and the reference limb segment will be displaced together with relatively little change in the force between them. Thus, it is expected that such external forces will not inadvertently cause erroneous control inputs. In other embodiments, other types of forces may be employed. Moreover, embodiments of the present invention can apply to any powered device, including computer and alternative augmentative communication (AAC) access and control, for example.

Controller

The controller can be responsive to output signals communicated from the wearable interface. The overall goal of the controller can be to operate a powered device in accordance with signals communicated from the end user via the wearable interface.

In one embodiment, the controller can be a microprocessor electrically coupled to a powered device. The microprocessor can be analog or digital and can contain circuits to be programmed for performing operational functions of the powered device based on various signals communicated from the wearable interface. Circuits or programs for performing such operational functions are conventional and well known. In addition, while the controller has been described as having a single microprocessor for operating a device, it should be understood that two or more microprocessors could be used.

In certain embodiments, the controller can continually monitor the signals provided by the wearable interface. In other embodiments, communications from the wearable interface can be stored in the memory of a microprocessor for as-needed retrieval and analysis. The memory can be, for example, a floppy disk drive or internal RAM or hard drive of the associated microprocessor. Data can be stored by the microprocessor to provide a permanent log of all events related to the end user's instructions via the wearable interface to operate the powered device.

In a specific embodiment, the controller can be a microprocessor electrically coupled to a powered wheelchair. The controller can include circuits or programs for performing such operational functions as speed and direction of the powered wheelchair. The circuits or programs for performing such operational functions are conventional and well known.

Examples of Wheelchair Control Devices

Wheelchair steering is a two-degree-of-freedom control task, including control of fore-aft motion and left-right (turning) motion or equivalently, speed and direction. Scissoring of the first toe up and big toe down, as if to cross the former over the latter, is medial relative rotation (MRR) in the sense that the upper toe begins to cross medially over the big toe. The opposite is also straightforward: relative rotation of the big toe upward and across the first toe is lateral movement of the upper toe: lateral relative rotation (LRR). As for FE, production of force, with little or no rotation, while a less common activity, is also feasible.

In an embodiment, a control device can use two square-shaped Force Sensing Resistors (FSRs) and an orthoplast in an orthosis to be used on an end user's foot. In a related embodiment, the output signals of a force-sensitive transducer can communicate with a powered wheelchair's power control, providing two-degree-of-freedom control of the powered wheelchair in speed and direction. Referring again to FIGS. 3-5, there can be two FSR's per foot: an upper FSR above the toes and a lower FSR beneath the toes. In one embodiment, the upper FSRs can serve to activate the powered wheelchair (ECW) to move in the reverse direction. The lower FSRs can serve to activate the powered wheelchair to move in the forward direction. A "skid steer" control model can be used in which each foot can independently control one motor. For example, the left foot can control the right side motor, and the right foot can control the left side motor. This can allow for intuitive steering in either direction. The end user can determines the speed of the wheelchair by applying varying amounts of pressure to the FSRs with the toes. To turn the wheelchair, the end user can apply more pressure to one foot than the other.

In another embodiment, direction control can be accomplished by dorsiflexion and plantarflexion of the primary foot while speed control can be accomplished by dorsiflexion and plantarflexion of the secondary foot. A force-sensing transducer can use distributed strain sensing. For example, the outside dorsal and/or plantar surface of the orthosis on each foot can be instrumented with a bridge circuit of suitably placed strain gauges. Linearized by downstream processing, the magnitude and sign of the signal from these sensors can be used to control direction or speed. Such a design takes advantage of the orthosis shell itself as a mechanical element of the sensor system.

In one embodiment, the end user can wear a force-sensing orthosis as part of a wearable interface. Thus, the wheelchair control system is referenced the end user's body rather than to the wheelchair frame. By moving the point of access, or reference frame, of the control from the wheelchair frame to the end user's body, extraneous movements associated with reaching and postural maintenance against gravity are reduced. This is especially beneficial for individuals with abnormal muscle tone (i.e., athetoid, dystonic, ataxic). A wearable interface can help eliminate the need for an end user to repeatedly reposition a limb to grasp or contact an externally mounted control. Activation forces are supplied by the body segment while stabilization forces are provided by the orthosis.

In another embodiment, wearable interface signaling can be based on ankle extension/flexion and/or inversion eversion torques. The mechanical combination of one of these torques with toe extension/flexion force relative to the foot (or the application of the two torques about the ankle alone) can be sensed and decoupled by suitably placed strain gauges mounted to the outside surface of an orthosis. Such embodiments take advantage of the orthosis shell itself as a mechanical element whose strain can be sensed.

In yet another embodiment, a single foot can be used to control both direction and speed. Unison dorsiflexion or plantarflexion force of the big toe and four small toes can result in forward or reverse motion, respectively, of powered wheelchair along a straight path. Relative force, i.e. the difference between the forces applied by the big toe and the four small toes, can control steering. This can be accomplished by mounting four FSRs on a single orthosis: one above and one below the big toe and one above and one below the four small toes acting together.

According to yet another embodiment, the wearable interface can include an orthosis designed to provide sufficient space for the toes or other contemplated body part for comfort and operation. Padding can consist of a thermoplastic or rubber bridge across foam, formed to the top of the end user's body part. In yet another embodiment, hook and loop fastener (e.g., VELCRO®) straps can secure the orthosis to the body part.

In certain embodiments, an orthoplast material can be used to create the orthosis. A suitable material can be a low-temperature thermoplastic with excellent drape, moldability and rigidity, available under the name ORTHOPLAST® II from Medco School First Aid, Tonawanda, N.Y. The orthoplast can be custom fit to the body part of the end user. Where the orthosis is for the foot, it can be worn over a standard sock and have the ability to fit inside a standard sneaker or shoe or be concealed by an age- and occasion-appropriate orthotic cover. In this embodiment, the orthosis provides a rigid surface against which pressure can be applied to the FSR through forces produced by the toes. This provides a platform that is not referenced to the wheelchair, but rather to the end user's foot. Between the FSRs and the toes, there may be cushioning foam to reduce the pressure felt by the FSRs in order to maximize the range of force the end user will be able to apply.

Figure 6:
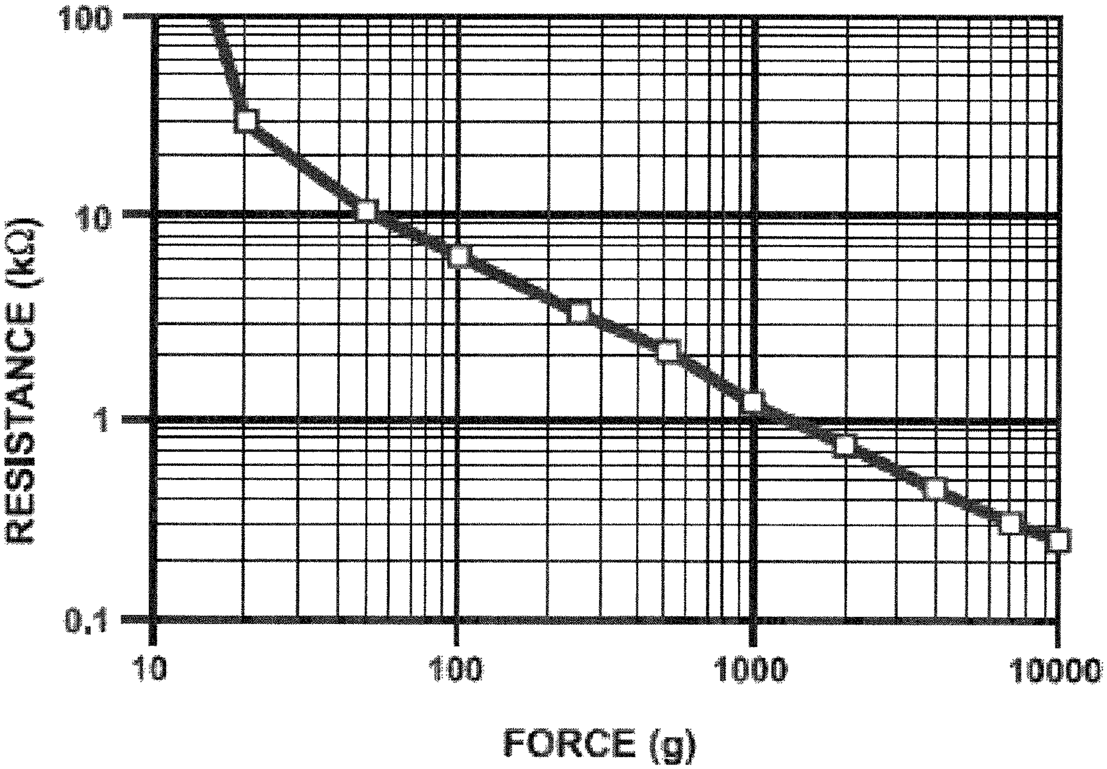
FIG. 6 is log-log plot of force (g) vs. resistance (kΩ) of a Force Sensing Resistor (FSR).
Figure 7:
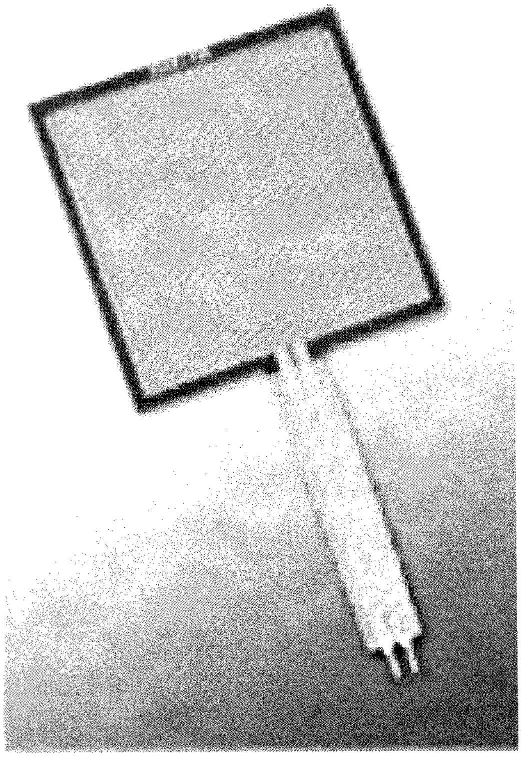
FIG. 7 is a photograph of a square FSR

When no force is applied, the FSR can act as an infinite resistor. As more force is applied, the resistance drops in a manner that is inversely proportional to the force. A log-log plot of force vs. resistance can be seen in FIG. 6. Small square-shaped FSRs can be used in confined spaces. An example of an FSR is model FSR460 from Interlink Electronics, Camarillo, Calif. The square FSR shown in FIG. 7 is about 1.5 inches on each side. It has a force sensitivity range of about 1 N to about 100 N and a pressure sensitivity range of about 1.5 psi to about 150 psi. As specified above, a cushioning foam can be used to limit the amount of force felt by the FSR. This can allow for an effective force range that is much larger than specified by the manufacturer. In one embodiment, the FSRs can be provided in a sealed transducer array that can be mounted on an orthosis shell and then removed and reused when the orthosis needs replacement.

Figure 8:
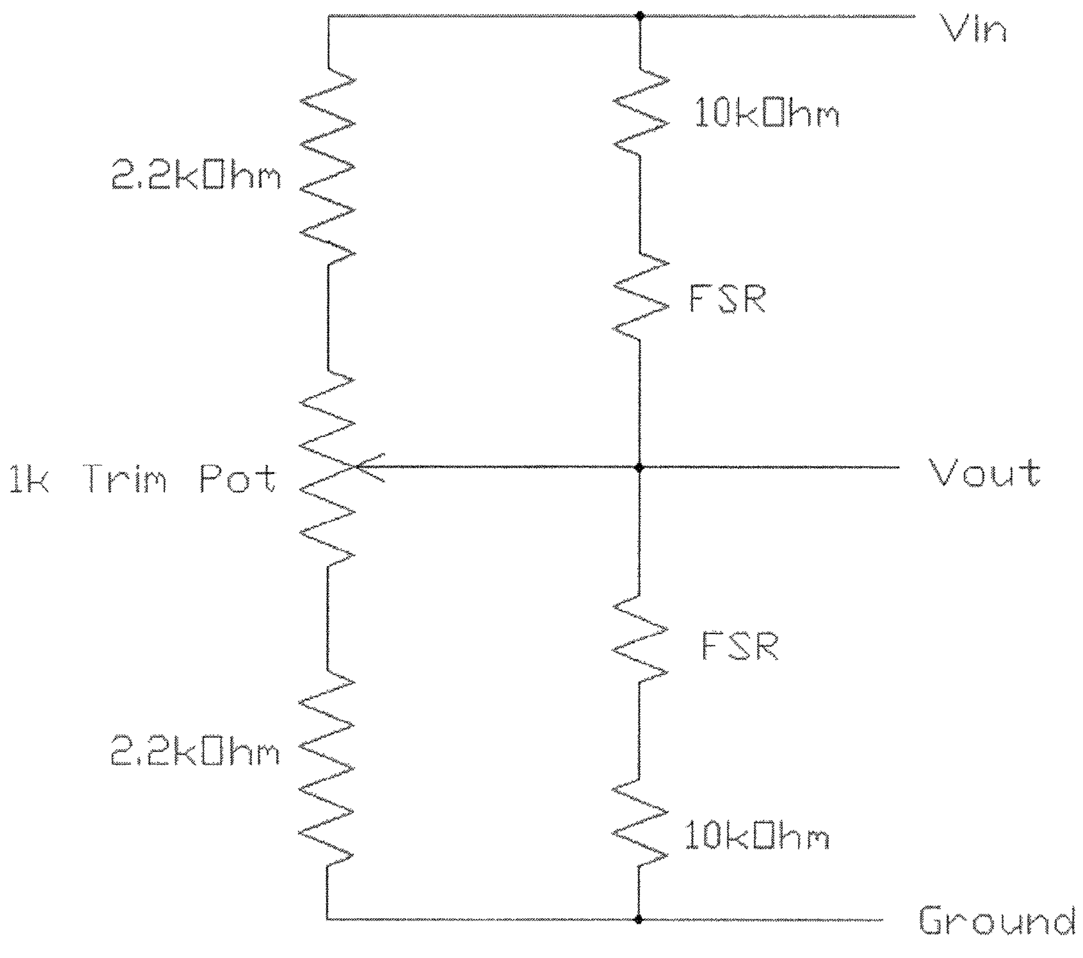
FIG. 8 shows a circuit design. .

In one embodiment, to implement FSRs into powered wheelchair control system, a circuit can be designed in conjunction with proper signal processing to allow for desired wheelchair performance. The aim can be to have acceleration and steering characteristics that mimic power wheelchair controls. FIG. 8 shows an example of a circuit design, in which a trim pot is introduced to adjust neutral voltage. For example, in a specific embodiment, a voltage of about 6.02 V can be used to start a powered wheelchair. Additionally, in certain embodiments, the wearable interface and the powered wheelchair can be connected via cable through an easily disconnected jack and plug. In further embodiments, circuitry can be included to allow for a wireless orthosis.

Though examples of wheelchair control devices have been described in detail, embodiments of the present invention can be used with any powered device. In one embodiment, a control device of the present invention can be any powered device that is not a wheelchair.

It should be understood that the examples and embodiments described herein are for illustrative purposes only and that various modifications or changes in light thereof will be suggested to persons skilled in the art and are to be included within the spirit and purview of this application.

We claim:

1. A system for designing a control device, comprising:
- an expert system, wherein the expert system comprises a computer processor;
- a user interface for a system user to provide data to the expert system;
- a software-based menu of elements of the control device, wherein at least one of the elements can be selected by the system user via the user interface; and
- a software-based decision guide for selecting appropriate components for the control device to meet an end user's functional needs, an end user's constraints, or both, wherein input is provided by the system user via the user interface in response to one or more queries of the decision guide, wherein the input provided by the system user in response to the one or more queries of the decision guide includes at least one type of information selected from the following group: information about an end user's abilities, information about an end user's needs, and information about an end user's preferences;
- wherein the expert system processes data provided by the system user and the decision guide for selecting appropriate components and uses the processed data to design the control device;
- and wherein the designed control device comprises:
  - a controller; and
  - a wearable interface for communicably connecting to the controller, the wearable interface comprising a force-sensing transducer for positioning between two adjacent body segments of the end user;
    - wherein, when the wearable interface is communicably connected to the controller, a force applied to the force-sensing transducer by at least one of the two adjacent body segments is communicated to the controller for controlling an assistive device.

2. The system according to claim 1, wherein the wearable interface is an orthosis.

3. The system according to claim 1, wherein the system user is a clinician.

4. The system according to claim 1, wherein the end user has a condition selected from the group consisting of: Alzheimer's disease, Amyotrophic Lateral Sclerosis, Parkinson's disease, Frederick's ataxia, muscular dystrophy, multiple sclerosis, spinal cord injury, cerebral palsy, stroke, and traumatic brain injury.

5. The system according to claim 1, wherein the user interface is a web-based interface.

6. The system according to claim 1, wherein the menu of elements comprises sensors, materials, and wireless transmitters.

7. The system according to claim 1, wherein the two adjacent body segments are located on a foot.

8. The system according to claim 1, wherein the assistive device is a powered wheelchair.

9. A control device designed by the system according to claim 1.

10. A system for designing a kit of components of a control device, comprising:

an expert system, wherein the expert system comprises a computer processor;

a user interface for a system user to provide data to the expert system;

a software-based menu of elements of the kit, wherein the elements can be selected by the system user via the user interface; and a software-based decision guide for selecting appropriate components for the kit to meet an end user's functional needs, an end user's constraints, or both, wherein input is provided by the system user via the user interface in response to one or more queries of the decision guide, wherein the input provided by the system user in response to the one or more queries of the decision guide includes at least one type of information selected from the following group: information about an end user's abilities, information about an end user's needs, and information about an end user's preferences;

wherein the expert system processes data provided by the system user and the decision guide for selecting appropriate components and uses the processed data to design the kit;

and wherein the designed kit comprises:

a controller;

a wearable interface for communicably connecting to the controller; and a force-sensing transducer for positioning between two adjacent body segments of the end user;

wherein, when the control device is worn by the end user, a force applied to the force-sensing transducer by at least one of the two adjacent body segments is communicated to the controller for controlling an assistive device.

11. The system according to claim 10, wherein the system user is a clinician.

12. The system according to claim 10, wherein the end user has a condition selected from the group consisting of: Alzheimer's disease, Amyotrophic Lateral Sclerosis, Parkinson's disease, Frederick's ataxia, muscular dystrophy, multiple sclerosis, spinal cord injury, cerebral palsy, stroke, and traumatic brain injury.

13. The system according to claim 10, wherein the user interface is a web-based interface.

14. The system according to claim 10, wherein the menu of elements comprises sensors, materials, components, and wireless transmitters.

15. A kit designed by the system according to claim 10.

16. A system for designing a control device, comprising:

an expert system, wherein the expert system comprises a computer processor;

a user interface for a system user to provide data to the expert system;

a software-based menu of elements of the control device, wherein at least one of the elements can be selected by the system user via the user interface; and a software-based decision guide for selecting appropriate components for the control device to meet an end user's functional needs, an end user's constraints, or both, wherein input is provided by the system user via the user interface in response to one or more queries of the decision guide, wherein the input provided by the system user in response to the one or more queries of the decision guide includes at least one type of information selected from the following group: information about an end user's abilities, information about an end user's needs, and information about an end user's preferences;

wherein the expert system processes data provided by the system user and the decision guide for selecting appropriate components and uses the processed data to design the control device;

and wherein the designed control device comprises:

a controller; and a wearable interface for communicably connecting to the controller, the wearable interface comprising a force-sensing transducer for positioning between the wearable interface and a body segment of the end user;

wherein, when the wearable interface is communicably connected to the controller, a force applied to the force-sensing transducer by the body segment is communicated to the controller for controlling an assistive device.

* * * * *